United States Patent
Tsai

(10) Patent No.: US 9,482,448 B2
(45) Date of Patent: Nov. 1, 2016

(54) SOLAR THERMAL COLLECTOR, SOLAR THERMAL HEATER AND METHOD OF MANUFACTURING THE SAME

(71) Applicant: Taiwan Ziolar Technology Co. Ltd., Tainan (TW)

(72) Inventor: Jen-Huang Tsai, Taipei (TW)

(73) Assignee: Taiwan Ziolar Technology Co. Ltd., Tainan (TW)

( * ) Notice: Subject to any disclaimer, the term of this patent is extended or adjusted under 35 U.S.C. 154(b) by 570 days.

(21) Appl. No.: 14/017,324

(22) Filed: Sep. 4, 2013

(65) Prior Publication Data
US 2015/0059734 A1 Mar. 5, 2015

(51) Int. Cl.
*F24J 2/48* (2006.01)
*F24J 2/34* (2006.01)
*F24J 2/20* (2006.01)
*F24J 2/46* (2006.01)

(52) U.S. Cl.
CPC ............... *F24J 2/485* (2013.01); *F24J 2/205* (2013.01); *F24J 2/345* (2013.01); *F24J 2/4652* (2013.01); *Y02E 10/44* (2013.01); *Y10T 29/49355* (2015.01); *Y10T 29/49366* (2015.01); *Y10T 29/49888* (2015.01)

(58) Field of Classification Search
CPC ............ F24J 2/485; F24J 2/345; F24J 2/205; F24J 2/4652; Y02E 10/44; Y02E 29/49355; Y02E 29/49366; Y02E 29/49888
See application file for complete search history.

(56) References Cited

U.S. PATENT DOCUMENTS 3,859,980 A * 1/1975 Crawford ............... F24J 2/242
126/563
4,582,764 A 4/1986 Allerd et al.
4,594,995 A 6/1986 Garrison
5,523,132 A 6/1996 Zhang et al.
7,552,726 B2 6/2009 Kuckelkorn et al.
7,585,568 B2 9/2009 Barshilia et al.
7,909,029 B2 3/2011 Kuckelkorn et al.
(Continued)

FOREIGN PATENT DOCUMENTS

CN 201218622 4/2009
CN 201449047 U 5/2010
(Continued)

OTHER PUBLICATIONS

"Office Action of China Counterpart Application", issued on Nov. 30, 2015, p. 1-p. 10, in which the listed references were cited.

*Primary Examiner* — Alfred Basichas
(74) *Attorney, Agent, or Firm* — Jianq Chyun IP Office

(57) ABSTRACT

A solar thermal collector including a carrier, channels and a solar selective coating is provided. The channels are embedded in the carrier for a heat transfer fluid flowing therein. The solar selective coating is deposited on an outer surface of the carrier. The solar selective coating includes a damping layer, an absorbing layer and an anti-reflecting layer. The damping layer is deposited on the outer surface of the carrier. The absorbing layer is deposited on the damping layer, wherein the absorbing layer has a transition region including plural sub-layers and located adjacent to the damping layer. The anti-reflecting layer is deposited on the absorbing layer, wherein a light beam is adapted to enter the absorbing layer through the anti-reflecting layer, and irradiation energy of the light beam is transformed by the collector into thermal energy, which is then transmitted to the heat transfer fluid in the channels.

20 Claims, 8 Drawing Sheets

(56) References Cited

U.S. PATENT DOCUMENTS 8,153,929 B2     4/2012    Kuster et al.
2008/0190414 A1    8/2008    Link

FOREIGN PATENT DOCUMENTS

| | | |
|---|---|---|
| CN | 201476615 | 5/2010 |
| CN | 201547968 | 8/2010 |
| CN | 102121757 | 7/2011 |
| CN | 202083131 | 12/2011 |
| CN | 103047880 | 4/2013 |
| CN | 202993617 | 6/2013 |
| CN | 203518299 | 4/2014 |
| KR | 20100014203 | 2/2010 |
| WO | 2006031108 A2 | 3/2006 |
| WO | 2013053979 A1 | 4/2013 |

* cited by examiner

SOLAR THERMAL COLLECTOR, SOLAR THERMAL HEATER AND METHOD OF MANUFACTURING THE SAME

TECHNICAL FIELD

The application relates to a solar thermal collector with a solar selective coating and a solar thermal heater applying the solar thermal collector.

BACKGROUND

In recent years, there have been many developments that apply solar energy as an energy source, for example, the irradiance of the solar energy is converted into electrical energy or thermal energy for application. Taking a solar water heater as an example, an operation principle of the solar water heater is to absorb the irradiation energy of the sunlight for heating water. The solar water heater is configured with a solar selective coating for transferring the irradiation energy into heat.

FIG. 1A is a schematic diagram of a conventional solar thermal collector. FIG. 1B is an enlarged partial view of the solar thermal collector of FIG. 1 along a section line I-I'. There are different types of solar thermal collectors. FIG. 1A and FIG. 1B represent a common type of solar thermal collector that absorbs the solar irradiance through an absorber plate 12 to transfer the solar energy into heat. Then the heat is transmitted to the heat conducting tubes 14, which are distributed on the absorber plate 12, so as to heat up a heat transfer fluid (for example, water or other suitable fluid, which is not shown) in the heat conducting tubes 14. In other words, after the solar irradiance is absorbed by the absorber plate 12 on the solar thermal collector 10, the absorbed irradiance is transferred into thermal energy, and the thermal energy is transmitted to the heat conducting tubes 14 by thermal conduction through the welding junction between the absorber plate 12 and the heat conducting tubes 14. Then the thermal energy transmitted to the heat conducting tubes 14 is further transmitted to the heat transfer fluid in the heat conducting tubes 14 by means of thermal conduction and convection, so as to heat up the heat transfer fluid. Moreover, the absorber plate 12 of the solar thermal collector 10 is generally coated with a solar selective coating (not shown) capable of improving solar irradiance absorbing efficiency, so as to improve the solar thermal transfer efficiency of the absorber plate 12.

However, according to the above description, it is known that the solar thermal energy has to go through a long distance, by means of thermal conduction, to cross the absorber plate 12, and through the welding junction and the wall of the heat conducting tubes 14 before it is transmitted to the heat transfer fluid in the heat conducting tubes 14. In other words, the transmission path of the solar thermal energy is relatively long. Specifically, as shown in FIG. 1A and FIG. 1B, in a common type of solar thermal collector 10, which is configured with the absorber plate 12 and the heat conducting tubes 14, where the heat conducting tubes 14 are generally welded onto the absorber plate 12, the solar thermal energy is transmitted to the heat transfer fluid in the heat conducting tube 14 through the absorber plate 12, the welding junction between the absorber plate 12 and the heat conducting tube 14, and the wall of heat conducting tubes 14. In this way, the transmission path between the absorber plate 12 and the heat conducting tube 14 is relatively long (i.e. the thermal energy has to pass through the absorber plate 12, the welding junction, and tube walls of the heat conducting tubes 14 before it is transmitted to the heat transfer fluid), and since the absorber plate 12 and the heat conducting tubes 14 are in contact with each other only through welding points, the contact area in between is relatively small (an area A shown in FIG. 1B). Overall, the solar thermal energy cannot be effectively transmitted to the heat transfer fluid. Therefore, the heat conductivity and thermal efficiency of the solar thermal collector 10 is limited.

In the conventional solar thermal collector 10, the solar selective coating on the absorber plate 12 is generally applied before welding with the heat conducting tubes 14. Therefore, the welding energy causes damage on the surface of absorber plant 12 and reduces the irradiance absorbing efficiency. Moreover, the absorber plate 12 used by the conventional solar thermal collector is generally made of metal with high heat conductivity, such as Al or Cu, to avoid the thermal efficiency of the solar thermal collector 10 to decrease further.

SUMMARY

The application provides a solar thermal collector including a carrier, a plurality of channels and a solar selective coating. The channels are embedded in the carrier for a heat transfer fluid flowing therein. The solar selective coating is then deposited on an outer surface of the carrier, after the channels and the carrier are formed. The solar selective coating includes a damping layer, an absorbing layer and an anti-reflecting layer. The damping layer is deposited on the outer surface of the carrier. The absorbing layer is deposited on the damping layer, where the absorbing layer has a transition region adjacent to the damping layer, and the absorbing layer in the transition region includes a plurality of sub-layers. The anti-reflecting layer is deposited on the absorbing layer, where a solar irradiance beam is adapted to enter the absorbing layer through the anti-reflecting layer, and the thermal energy transferred from the solar irradiance is transmitted, through the outer surface of the carrier, to the heat transfer fluid in the channels after being absorbed by the absorbing layer.

The application provides a solar thermal heater including the aforementioned solar thermal collector, a heat exchanger, and a storage device. The storage device is connected to the solar thermal collector through a heat exchanger for storing the medium, such as water, heated by the heat exchanger and the heat transfer fluid, which receives the heat from the solar thermal collector.

The application provides a method for manufacturing a solar thermal collector including following steps. A carrier is provided, and plural channels are embedded in the carrier. A solar selective coating is then formed on an outer surface of the carrier, which includes the following steps. A damping layer is formed on the outer surface of the carrier. An absorbing layer is formed on the damping layer, where the absorbing layer has a transition region adjacent to the damping layer, and the step of forming the absorbing layer in the transition region includes sequentially forming a plurality of sub-layers. An anti-reflecting layer is formed on the absorbing layer.

Several exemplary embodiments accompanied with figures are described below to further describe the disclosure in details.

BRIEF DESCRIPTION OF THE DRAWINGS

The accompanying drawings are included to provide a further understanding of the application, and are incorporated in and constitute a part of this specification. The drawings illustrate embodiments of the application and, together with the description, serve to explain the principles of the application.

DESCRIPTION OF EMBODIMENTS

Figure 2:
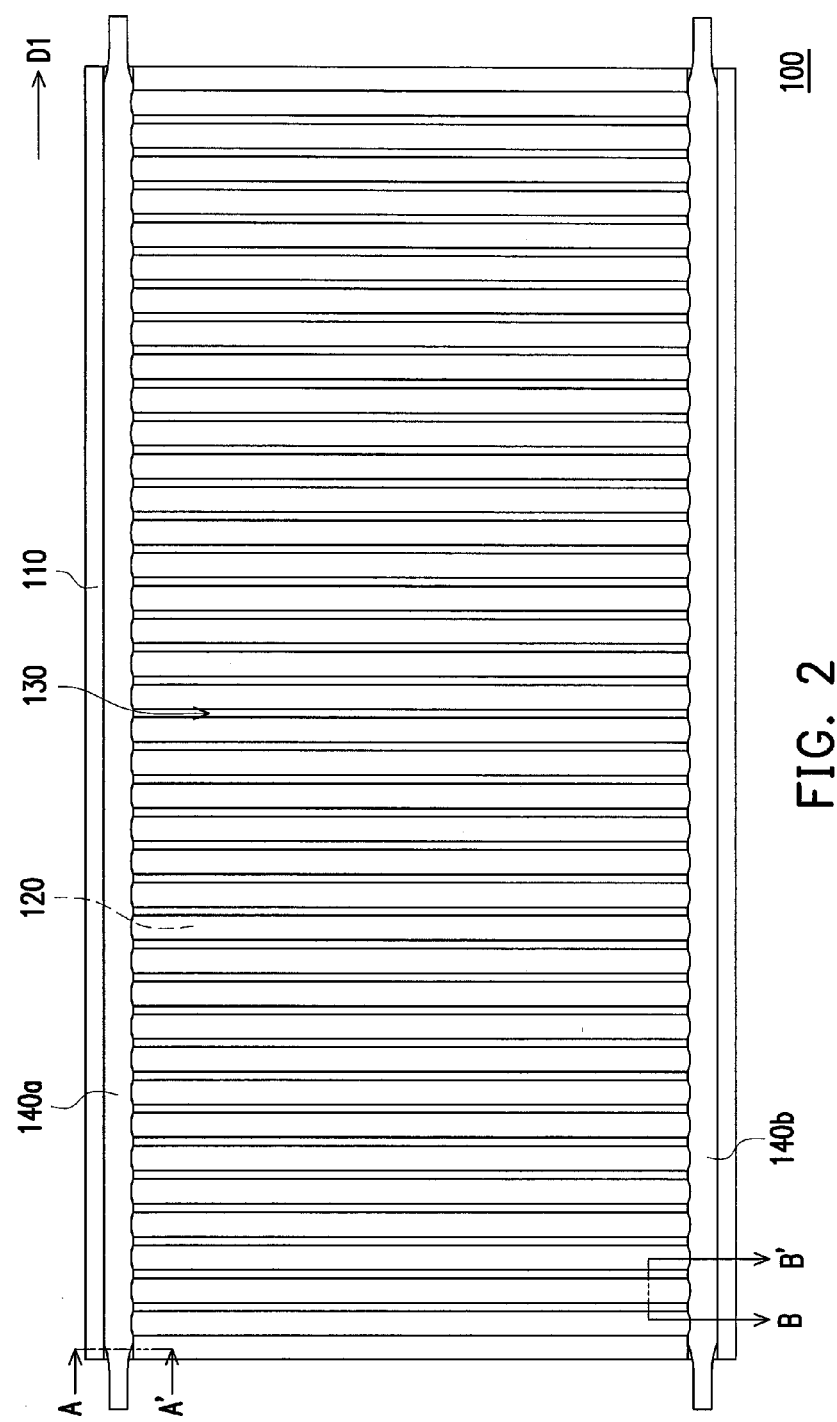
FIG. 2 is a schematic diagram of a solar thermal collector according to an embodiment of the application.
Figure 3A:
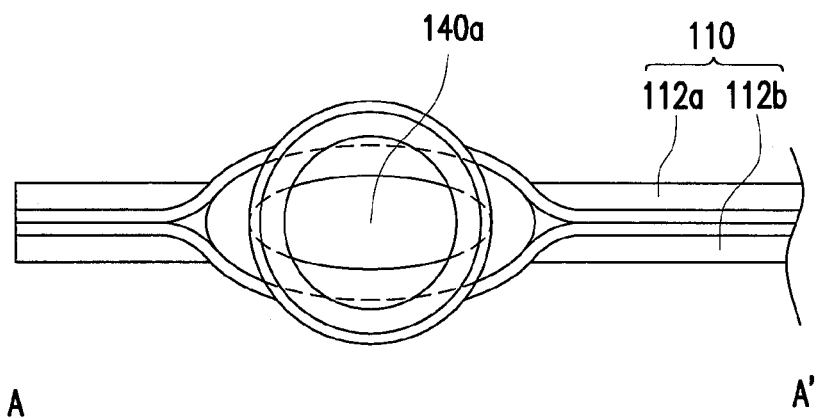
FIG. 3A is a partial enlarged view of the solar thermal collector of FIG. 2 along a section line A-A'.
Figure 3B:
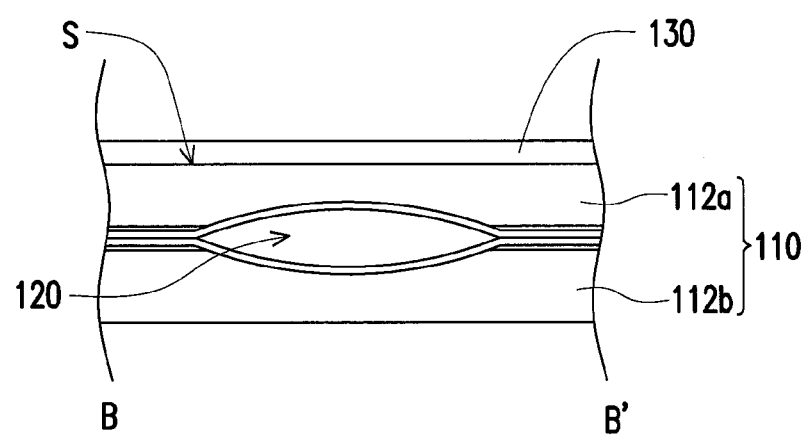
FIG. 3B is a partial enlarged view of the solar thermal collector of FIG. 2 along a section line B-B'.

FIG. 2 is a schematic diagram of a solar thermal collector according to an embodiment of the application. FIG. 3A is a partial enlarged view of the solar thermal collector of FIG. 2 along a section line A-A'. FIG. 3B is a partial enlarged view of the solar thermal collector of FIG. 2 along a section line B-B'. Referring to FIG. 2, FIG. 3A and FIG. 3B, in the present embodiment, the solar thermal collector 100 includes a carrier 110, a plurality of channels 120, a solar selective coating 130, a first connecting tube 140a and a second connecting tube 140b. The channels 120 are embedded in the carrier 110 for a heat transfer fluid (not shown) flowing therein. The solar selective coating 130 is then deposited on an outer surface S of the carrier 110. The first connecting tube 140a and the second connecting tube 140b are respectively deployed at two opposite sides of the carrier 110 and are connected to the channels 120. The solar thermal collector 100 can be applied to a solar thermal heater 50 (shown in FIG. 7), where the solar thermal heater 50 with a heat exchanger (not shown) is, for example, a solar water heater. An operation principle of the solar water heater is to absorb irradiation energy of the sunlight to heat water, and the solar thermal collector 100 is used to collect the thermal energy transferred from the solar irradiance, and is applied to the solar water heater. Therefore, in the present embodiment, the sunlight is adapted to enter the solar selective coating 130, and after the irradiation energy of the sunlight is absorbed by the absorber 130 and transferred into thermal energy, the thermal energy is transmitted to the heat transfer fluid (for example, water or glycol water) in the channels 120.

Figure 1A:
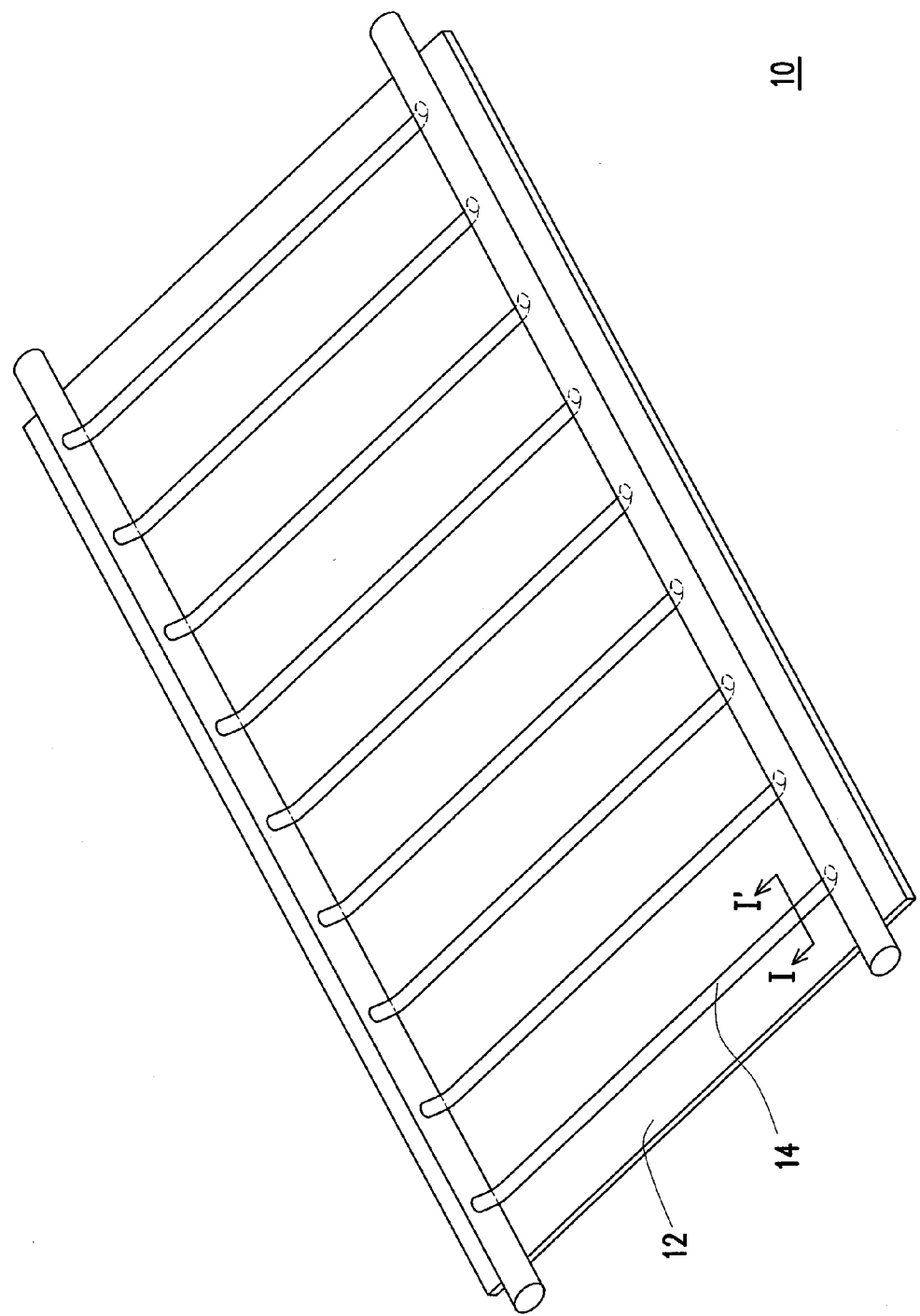
FIG. 1A is a schematic diagram of a conventional solar thermal collector.
Figure 1B:
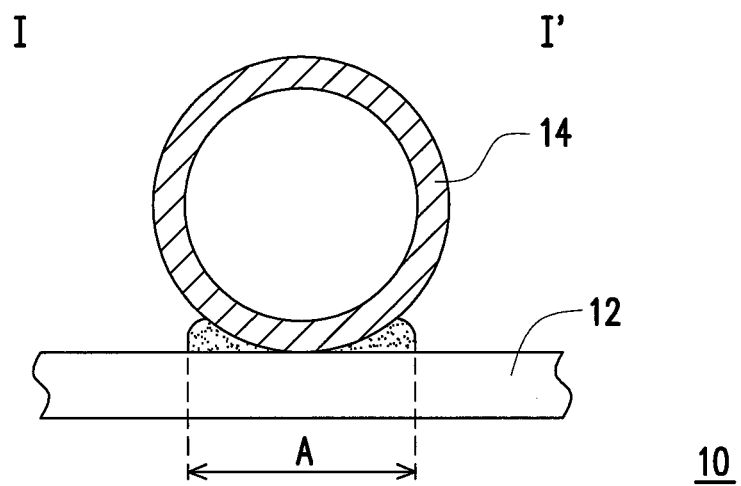
FIG. 1B is a partial enlarged view of the solar thermal collector of FIG. 1A along a section line I-I'.

In detail, in the present embodiment, the carrier 110 includes two shaped boards 112a and 112b (shown in FIG. 3A and FIG. 3B), and the two shaped boards 112a and 112b are attached to each other, and the channels 120 are formed between the two shaped boards 112a and 112b, for example, grooves intended to construct the channels are first formed on the two shaped boards 112a and 112b through mechanical processing, and after the two shaped boards 112a and 112b are attached, the grooves form the channels 120, as that shown in FIG. 3B. Therefore, the channels 120 embedded in the carrier 110 are substantially formed by the carrier 110, and the channels 120 and the carrier 110 share the same outer surface S. Therefore, when the solar selective coating 130 is deposited on the outer surface S of the carrier 110, the solar selective coating 130 is also deposited on the outer surface of the channels 120 (i.e., the channels 120 and the carrier 110 share the same outer surface S). Therefore, when the sunlight enters the solar selective coating 130, the irradiation energy of the sunlight is transferred into heat by the solar selective coating 130, and is transmitted directly through the wall of channel 120 to the heat transfer fluid in the channels 120. Since the channels 120 and the carrier 110 share the same outer surface S, as compare with the conventional collector in FIG. 1A, the contact area of the channels 120 and the carrier 110 is increased and the thermal conduction path is shortened, so as to decrease loss of the thermal energy during the transmission. In this way, the solar thermal collector 100 has a good solar thermal collecting efficiency. However, in other embodiments, the carrier and the channels can also be integrally formed within a single board, such that the channels and the carrier share the same outer surface.

Moreover, in the present embodiment, the first connecting tube 140a and the second connecting tube 140b located at two opposite sides of the carrier 110 are respectively connected to the channels 120. For example, the first connecting tube 140a and the second connecting tube 140b extend along the first direction D1 to connect the channels 120 sequentially arranged along the first direction D1. The heat transfer fluid (for example, water or glycol water) enters the solar thermal absorber 110 through the first connecting tube 140a and flows into the channels 120. The heat transfer fluid flows out of the channels after receiving the thermal energy, and flows out of the solar thermal collector 100 through the second connecting tube 140b. However, the configuration method of the connecting tubes 140 of the application is not limited thereto. For example, the channels 120 can be connected in series to each other, and the two channels 120 in tandem are respectively connected to an inlet tube and an outlet tube. The heat transfer fluid enters the channels 120 from the inlet tube, and leaves the channels 120 from the outlet tube after receiving the thermal energy. Alternatively, the channels 120 embedded in the carrier 110 can be divided into a plurality of regions, and the channels 120 located at different regions are respectively connected to different connecting tubes. Therefore, the number and location of the connecting tubes and the method for connecting the channels 120 are not limited by the application, which can be adjusted according to an actual requirement.

Moreover, a fabrication method of the first connecting tube 140a and the second connecting tube 140b can also be adjusted according to actual requirements. For example, in the embodiment that the two shaped boards 112a and 112b are used to construct the carrier 110 and the channels 120, the first connecting tube 140a and the second connecting tube 140b can also be formed through the same formation method as the method forming the channels 120. For example, grooves intended to construct the connecting tubes are first formed on the two shaped boards 112a and 112b through mechanical processing, where the grooves intended to construct the connecting tubes are connected to the grooves intended to construct the channels. After the two shaped boards 112a and 112b are attached, the first connecting tube 140a and the second connecting tube 140b are formed through the grooves intended to construct the connecting tubes, as that shown in FIG. 3A. In other embodiments, the connecting tubes can also be metal tubes welded between the two shaped boards and connected to the channels, or the connecting tubes are integrally formed with the carrier and the channels through a single material. The application does not limit the fabrication method of the carrier, the channels and the connecting tubes.

Figure 4:
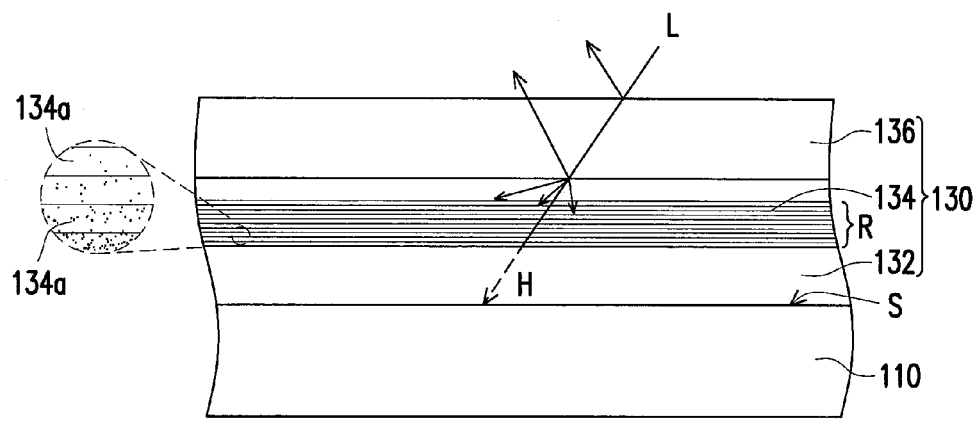
FIG. 4 is a partial schematic diagram of the solar thermal collector of FIG. 2.

FIG. 4 is a partial schematic diagram of the solar thermal collector of FIG. 2. Referring to FIG. 2 and FIG. 4, in the present embodiment, the solar selective coating 130 includes a damping layer 132, an absorbing layer 134 and an anti-reflecting layer 136. The damping layer 132 is deposited on the outer surface S of the carrier 110. The absorbing layer 134 is deposited on the damping layer 132. The anti-reflecting layer 136 is deposited on the absorbing layer 134. In the present embodiment, a material of the carrier 110 includes metal with a low emissivity, for example, aluminium (Al) or copper (Cu) with emissivity between 0.03 and 0.09. The damping layer 132 is formed on the outer surface S of the carrier 110 through a sputtering process, and a thickness thereof is between 30 nanometers (nm) and 150 nm. A material of the damping layer 132 includes metal nitride, metal carbide or metal carbon nitride, for example, ZrN, TiN, TiAlN, CrN, TiC, CrC, TiCN, TiAlCN, ZrCN, CrCN or a combination of the above materials, which is determined according to an actual requirement.

According to common interpretation, the emissivity mentioned in the application refers to "a ratio between energy radiated by a particular material and energy radiated by a blackbody at the same temperature", which serves as an indicator of substance absorbing capability and energy irradiation capability. Generally, the emissivity of a true blackbody is 1 while any real object would have an emissivity less than 1.

In addition, the absorbing layer 134 is deposited on the damping layer 132 through the sputtering process, and a thickness thereof is between 30 nm and 120 nm. In detail, the absorbing layer 134 has a transition region R adjacent to the damping layer 132, and the absorbing layer 134 in the transition region R includes a plurality of sub-layers 134a. A material of the absorbing layer 134 includes metal oxide and metal nitride, metal carbide or metal carbon nitride. In other words, the material of the absorbing layer 134 can be regarded as a mixture of metal oxide and the material of the damping layer 132. Moreover, a proportion of nitrogen content relative to oxygen content in the sub-layers 134a in the transition region R of the absorbing layer 134 or a proportion of carbon content relative to oxygen content thereof is gradually decreased towards a direction away from the damping layer 132, or even gradually decreased to zero. Namely, the proportion of the nitrogen content relative to the oxygen content in the sub-layer 134a closest to the damping layer 132 in the transition region R or the proportion of the carbon content relative to the oxygen content thereof is the greatest one in the proportions of all of the sub-layers 134a, or the above sub-layer 134a has a material composition closest to that of the damping layer 132. When the sub-layers 134a are sequentially formed on the damping layer 132 to form the transition region R, the proportions of the nitrogen content relative to the oxygen content or the proportions of the carbon content relative to the oxygen content of the sub-layers 134a are gradually decreased until the proportion is decreased to zero, and the material of the absorbing layer 134 outside the transition region R is metal oxide.

Moreover, in the present embodiment, the anti-reflecting layer 136 is deposited on the absorbing layer 134, and a thickness thereof is between 60 nm and 200 nm. A material of the anti-reflecting layer 136 includes silicon oxide or silicon nitride. Certainly, the aforementioned materials and thickness of the damping layer 132, the absorbing layer 134 and the anti-reflecting layer 136 of the absorbing coating 130 are only examples, which are not used to limit the application. In the present embodiment, since the solar selective coating 130 is deposited on the outer surface S of the carrier 110, the light beam L is adapted to be incident to the absorbing layer 134 through the anti-reflecting layer 136, and thermal energy H of the light beam L is transmitted to the thermal absorbing medium in the channels 120 after being absorbed by the absorbing layer 134.

Furthermore, when the light beam L is incident to the anti-reflecting layer 136, a part of the light beam L is reflected by the anti-reflecting layer 136, and a part of the light beam L is incident to the absorbing layer 134 through the anti-reflecting layer 136. Therefore, by suitably selecting the material of the anti-reflecting layer 136, a proportion of the light beam L incident to the absorbing layer 134 through the anti-reflecting layer 136 is increased (i.e. a proportion of the light beam L reflected by the anti-reflecting layer 136 is decreased). The light beam L enters the absorbing layer 134 along with the thermal energy H. The thermal energy H is absorbed by the absorbing layer 134, and is transmitted to the carrier 110 and the channels 120 embedded in the carrier 110 through the damping layer 132, where the damping layer 132 may be formed with suitable material to damp the light beam L entering the solar selective coating 130, so as to avoid the irradiation energy being bounced away and to further retain the thermal energy that is not fully absorbed by the absorbing layer 134. In this way, the light beam L provides the thermal energy H to the solar selective coating 130 through a manner to transfer the irradiation energy into thermal energy, and the thermal energy H is transmitted to the carrier 110 and the channels 120 through a heat conducting manner, and is further transmitted to the heat transfer fluid in the channels 120 through heat conducting and convection. The heat transfer fluid flows into the channels 120 of the solar thermal collector 100 through the first connecting tube 140a, and forms thermal convection in the channels 120 through temperature variation, and flows out of the solar thermal absorber 100 through the second connecting tube 140b. However, implementation of the solar thermal collector 100 of the present application is not limited to the aforementioned implementation. Another embodiment is provided below to describe another implementation, using different material for the carrier 110 and different deposition for the solar selective coating 130, of the solar thermal collector of the application.

Figure 5:
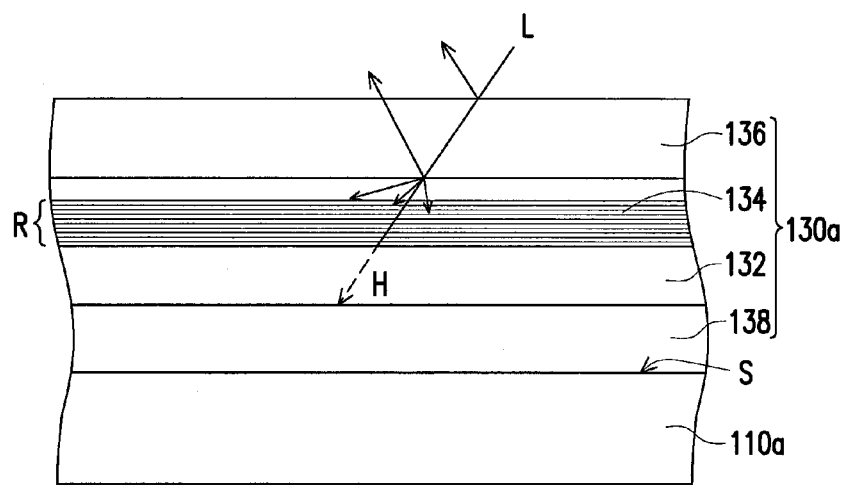
FIG. 5 is a partial schematic diagram of a solar thermal collector according to another embodiment of the application.

FIG. 5 is a partial schematic diagram of a solar thermal collector according to another embodiment of the application. Referring to FIG. 2 and FIG. 5, in the present embodiment, similar to the configuration of the solar thermal collector 100 of FIG. 2, the solar thermal collector 100a of FIG. 5 includes a carrier 110a, the channels 120, a solar selective coating 130a, the first connecting tube 140a and the second connecting tube 140b. A main difference between the solar thermal collector 100a of FIG. 5 and the solar thermal collector 100 of FIG. 4 is that the material of the carrier 110a of the solar thermal absorber 100a includes metal or plastic with emissivity greater than or equal to 0.1, where the metal is, for example, stainless steel (SUS), and the plastic is, for example, polymer (for example, high density polyethylene (HDPE)). Now, to reduce the heat loss during the thermal transmission process within the carrier 110a and the channels 120 made of the material with emissivity greater than or equal to 0.1, the solar selective coating 130a of the present embodiment further includes a metal layer 138. The metal layer 138 is deposited on the outer surface S of the carrier 110a and is located between the carrier 110a and the damping layer 132, and a thickness thereof is greater than 20 nm. An emissivity of the metal layer 138 is lower than the emissivity of the carrier 110a, and a material thereof is, for example, metal with a low emissivity (the emissivity between 0.03 and 0.09) such as Cr, Al, Ni, Mo, Cu or W, etc. In this way, the metal layer 138 can be used to change a characteristic of the outer surface S of the carrier 110a, for example, decrease the emissivity of the outer surface S of the carrier 110a.

According to the above descriptions, in the solar thermal collector (the solar thermal absorber 100 or 100a) of the present embodiment, since the channels are embedded in the carrier, the channels and the carrier share the same outer surface, and the contact area of the channels and the carrier is increased. When the light beam enters the solar selective coating, and after the thermal energy of the light beam is absorbed by the absorber or coating, the thermal energy can be directly transmitted to the heat transfer fluid in the channels. In this design, the channels and the carrier share the same outer surface, which may decrease the loss of the thermal energy during the transmission process. In this way, the solar thermal collector has a good solar thermal collecting efficiency. Moreover, when the carrier of the solar thermal collector adopts a material with an emissivity greater than or equal to 0.1, the metal layer made of a material with low emissivity (less than 0.1) can be deposited on the carrier to change the surface characteristic of the carrier. In this way, the solar thermal absorber of the present embodiment is not limited by material selection of the carrier.

Figure 6A:
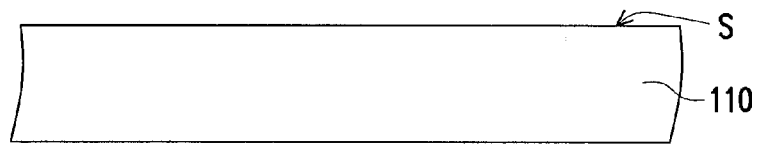
FIG. 6A to FIG. 6D are schematic diagrams illustrating a process of manufacturing the solar thermal collector of FIG. 4.

FIG. 6A to FIG. 6 are schematic diagrams illustrating a process of manufacturing the solar thermal collector of FIG. 4. Referring to FIG. 2, FIG. 4, FIG. 6A to FIG. 6D, in the present embodiment, a method for manufacturing the solar thermal absorber 100 includes following steps. First, as that shown in FIG. 6A, the carrier 110 is provided, and channels 120 (shown in FIG. 2) are embedded in the carrier 110. In other words, the channels 120 are first formed within the outer surface S of the carrier 110. The step of providing the carrier 110 and first forming the channels 120 within the outer surface S of the carrier 110 are as that described above, for example, the two shaped boards 112a and 112b are first provided (shown in FIG. 3B), and grooves intended to construct the channels 120 are first formed on the two shaped boards 112a and 112b through mechanical processing. Then, the two shaped boards 112a and 112b are attached, and the grooves form the channels 120 to make the channels 120 embedded in the carrier 110 between the two shaped boards 112a and 112b. Alternatively, the step of providing the carrier 110 can also be as that described above where the carrier 110 and the channels 120 are integrally formed through a single material, and the method of forming the carrier 110 and the channels 120 is not limited by the application.

Moreover, in the method of manufacturing the solar thermal collector 100, the first connecting tube 140a and the second connecting tube 140b are further formed at two opposite sides of the carrier 110, where the first connecting tube 140a and the second connecting tube 140b are connected to the channels 120. The method of forming the first connecting tube 140a and the second connecting tube 140b can be as that described above, by which grooves intended to construct the connecting tubes are formed between the two shaped boards 112a and 112b, and the first connecting tube 140a and the second connecting tube 140b are formed after the two shaped boards 112a and 112b are attached, or the first connecting tube 140a and the second connecting tube 140b can be additionally welded between the two shaped boards 112a and 112b (shown in FIG. 3A), or the first connecting tube 140a and the second connecting tube 140b are integrally formed with the carrier 110 and the channels 120 through a single material. The methods of forming the carrier 110, the channels 120, the first connecting tube 140a and the second connecting tube 140b are not limited by the application.

Figure 6B:
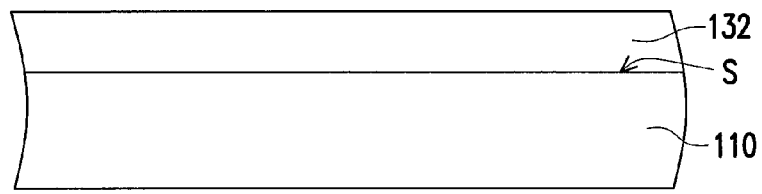
Figure 6C:
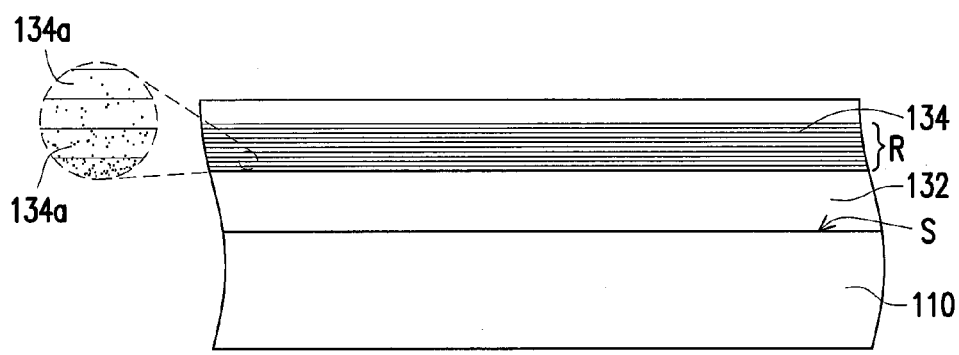
Figure 6D:
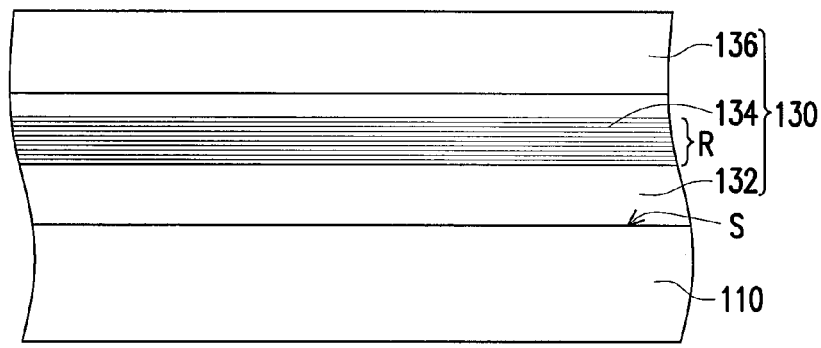

Finally, as that shown in FIG. 6B to FIG. 6D, the solar selective coating 130 is then formed on the outer surface S of the carrier 110, after the channels 120 and the connecting tubes 140a and 140b are formed. Before the solar selective coating 130 is formed on the outer surface S of the carrier 110, a clearing process is first performed on the outer surface S of the carrier 110 to, for example, remove solder residues generated when the first connecting tube 140a and the second connecting tube 140b are formed through welding, or remove material residues generated when the carrier 110 and the channels 120 are formed through mechanical processing or mechanical forming, or further remove particles adhered to the outer surface S of the carrier 110 to avoid influencing the sputtering process for forming the absorbing layer 130, so as to avoid influencing an effect of the absorbing coating 130. The method of forming the absorbing coating 130 on the outer surface S of the carrier 110 includes the following steps.

First, in FIG. 6B, the damping layer 132 is formed on the outer surface S of the carrier 110. The damping layer 132 is, for example, formed on the outer surface S of the carrier 110 through a sputtering process, and the material and thickness thereof can refer to the aforementioned descriptions.

Then, in FIG. 6C, the absorbing layer 134 is formed on the damping layer 132. The absorbing layer 134 is, for example formed on the damping layer 132 through a sputtering process, and the material and thickness thereof can refer to the aforementioned descriptions. The absorbing layer 134 has the transition region R adjacent to the damping layer 132, and the step of forming the absorbing layer 134 in the transition region R includes sequentially forming a plurality of sub-layers 134a. The sub-layers 134a in the transition region R are sequentially formed on the damping layer 132 through a sputtering process, and in the step of forming the sub-layers 134a, a proportion of nitrogen content relative to oxygen content in the sub-layers 134a or a proportion of carbon content relative to oxygen content thereof is gradually decreased towards a direction away from the damping layer 132, and is gradually decreased to zero. In other words, during the process of forming the absorbing layer 134 on the damping layer 132, the absorbing layer 134 gradually decreases the proportion of nitrogen content relative to oxygen content in the composed material or the proportion of carbon content relative to oxygen content thereof, and the material of the absorbing layer 134 formed outside the transition region R does not contain nitrogen or carbon.

Finally, in FIG. 6D, the anti-reflecting layer 136 is formed on the absorbing layer 134. The material and thickness of the anti-reflecting layer 136 may refer to the aforementioned descriptions. The damping layer 132, the absorbing layer 134 and the anti-reflecting layer 136 form the solar selective coating 130. The solar selective coating 130 is deposited on the outer surface S of the carrier 110, after the channels 120 and connecting tubes 140a and 140b are formed. The channels 120 and the carrier 110 share the same outer surface S, so that the thermal energy can be effectively transmitted to the heat transfer fluid in the channels 120. Based on the above descriptions, according to the method for manufacturing the solar thermal collector 100, since the channels are embedded in the carrier, the channels and the carrier share the same outer surface, and the contact area between the channels and the carrier is increased and the transmission path of the thermal energy is decreased, such that the solar thermal absorber has a superior thermal absorbing efficiency.

Conversely, when the material of the carrier 110 has an emissivity greater than or equal to 0.1, for example, metal (for example, stainless steel) or plastic (for example, polymer) (for example, the carrier 110a of FIG. 5), the method for manufacturing the solar thermal collector 100a further includes forming the metal layer 138 on the outer surface S of the carrier 110a (shown in FIG. 5) before the step of forming the damping layer 132 on the outer surface S of the carrier 110a, where the emissivity of the metal layer 138 is lower than the emissivity of the carrier 110a. In this way, the metal layer 138 can be used to change a characteristic of the outer surface S of the carrier 110a, such that the carrier of the solar thermal absorber is not limited to adopt a fixed type of material.

Figure 7:
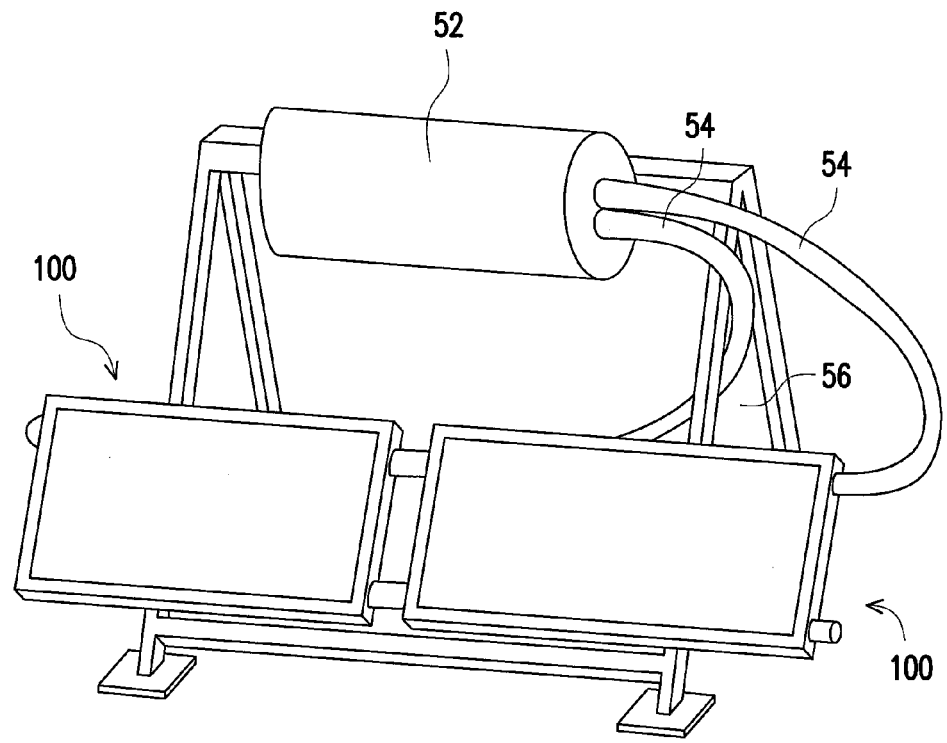
FIG. 7 is a schematic diagram of a solar thermal heater according to an embodiment of the application.
Figure 8:
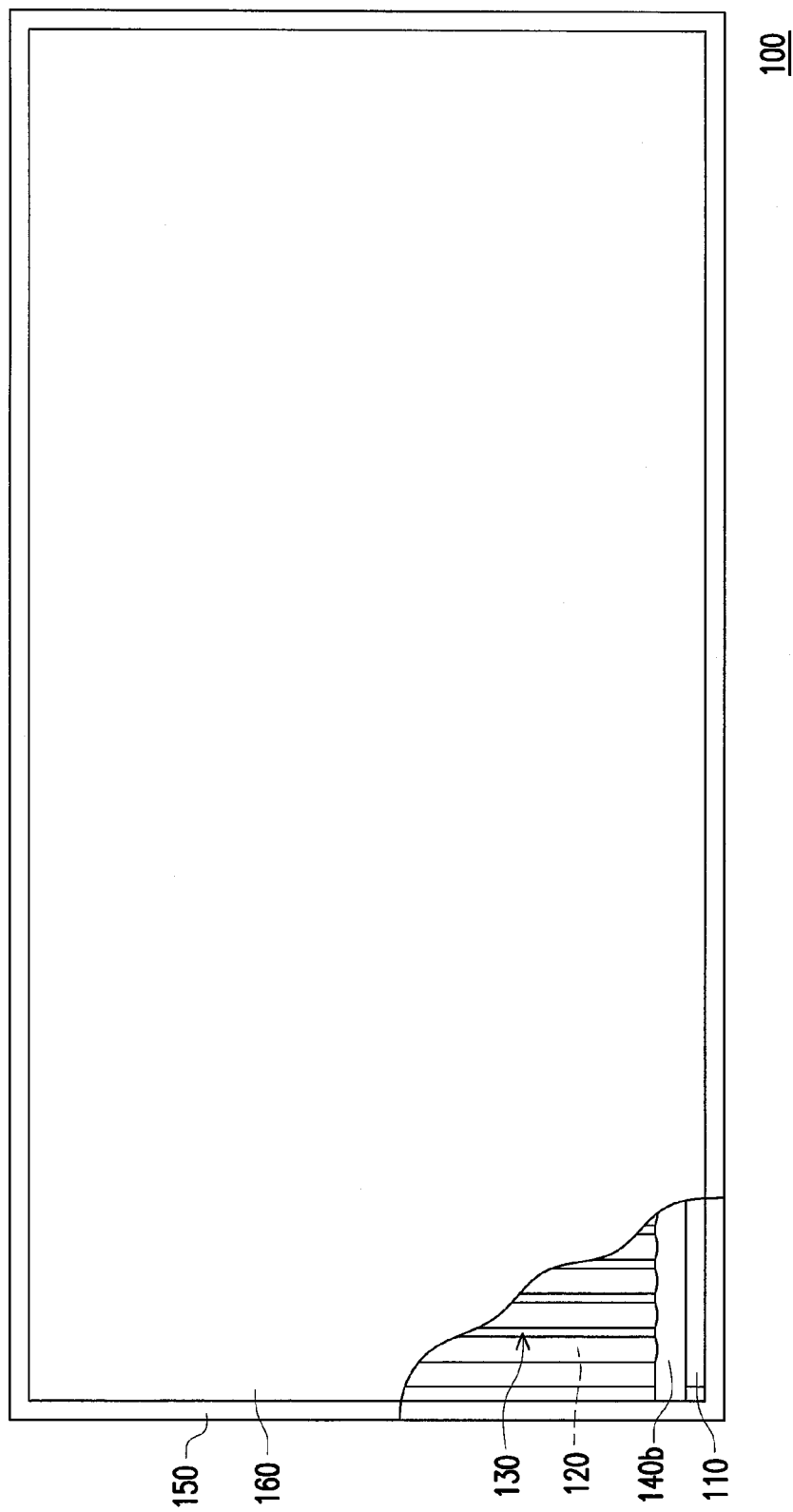
FIG. 8 is a top view of a solar thermal collector of FIG. 7.

FIG. 7 is a schematic diagram of a solar thermal heater according to an embodiment of the application. FIG. 8 is a top view of a solar thermal collector of FIG. 7. Referring to FIG. 2, FIG. 7 and FIG. 8, in the present embodiment, the solar thermal heater 50 includes the solar thermal collectors 100, a storage device 52, pipes 54 and a supporting frame 56. The solar thermal heater 50 is, for example, a solar water heater, and the storage device 52 is, for example, a hot water barrel. The storage device 52 is connected to the solar thermal collectors 100, through a heat exchanger (not shown), for storing the medium, such as water, heated by the heat exchanger and the heat transfer fluid, which receives the heat from the solar thermal collectors 100.

Further, the storage device 52 is connected to the first connecting tubes 140a and the second connecting tubes 140b of the solar thermal collectors 100 through the pipes 54 (shown in FIG. 2 and FIG. 8), such that the heat transfer fluid flows into the solar thermal absorbers 100 from the storage device 52 through the water pipes 54. After the heat transfer fluid receives the thermal energy from the solar thermal collectors 100, the heat transfer fluid flows back to the storage device 52 from the solar thermal collectors 100 through the pipes 54.

In detail, in the present embodiment, when the aforementioned solar thermal collectors 100 are applied to the solar thermal heater 50, the solar thermal collector 100 further includes a component capable of protecting the carrier 110, the channels 120, the absorbing coating 130, the first connecting tube 140a and the second connecting tube 140b. Referring to FIG. 8, the solar thermal collector 100 further includes an outer frame 150 and a cover plate 160. The carrier 110, the channels 120 the absorbing coating 130, the first connecting tube 140a and the second connecting tube 140b (shown in FIG. 2) of the solar thermal collector 100 are configured within the outer frame 150. The cover plate 160 covers the outer frame 150. The sunlight penetrates through the cover plate 160 to reach the absorbing coating 130, and the irradiation energy of the sunlight is transferred into thermal energy, and then is transmitted to the heat transfer fluid in the channels 120 through the solar selective coating 130. The outer frame 150 is used to load and protect most of the components of the solar thermal collector 100. The cover plate 160 is a transparent cover plate (which is, for example, made of glass), which is used for preventing a thermal convection loss and protecting the components configured within the outer frame 150. Moreover, an insulating material (not shown) can be filled in the outer frame 150 to prevent loss of the thermal energy that influences the thermal collecting efficiency of the solar thermal collector 100. In this way, the solar thermal collector 100 has superior thermal collecting efficiency.

Referring to FIG. 2, FIG. 7 and FIG. 8, in the present embodiment, the heat transfer fluid (for example, water or glycol water) flows into the first connecting tube 140a of the solar thermal absorber 100 from the storage device 52 through the pipe 54, and further flows into the channels 120. The irradiation energy of the sunlight is transformed into thermal energy, through the solar selective coating 130, then is transmitted to the carrier 110 and the channels 120, and is further transmitted to the thermal absorbing medium in the channels 120. After the heat transfer fluid receives the thermal energy in the channels 120, a temperature of the heat transfer fluid is increased, and a density thereof is decreased, so that the heated heat transfer fluid is able to automatically flow back to the storage device 52 through the second connecting tube 140b and the water pipe 54. In the present embodiment, the solar thermal heater 50 can serve as a source of domestic hot water, for example, serve as washing water provided by the solar water heater. In other embodiments, the solar thermal heater 50 can serve as a heating source for indirectly heating other mediums, such as air. Alternatively, the storage device 52 is not limited to store one type of medium, i.e. the storage device 52 of the present embodiment is not limited to a hot water barrel, and the storage device can also store the thermal energy using phase change materials.

In the present embodiment, the solar thermal collectors 100 and the storage device 52 are deposited on the supporting frame 56, such that the solar thermal heater 50 can be directly erected outdoors. Moreover, the hot water barrel serving as the storage device 52 is deposited beside the solar thermal absorbers 100, and the solar thermal collector 50 has two solar thermal absorbers 100 connected in series or parallel to each other, and the two solar thermal absorbers 100 share the common storage device 52. However, in other embodiments, the solar thermal collectors 100 and the storage device 52 of the solar thermal heater 50 can be directly erected at a fixed point (for example, on the roof or outside of balcony), so as to save the supporting frame 56, and the hot water barrel serving as the storage device 52 can be located at a place (for example, located indoors) far away from the solar thermal collectors 100. In the solar thermal heater 50 of the application, positions and numbers of the storage device 52 and the solar thermal collectors 100 can be adjusted according to an actual requirement. In addition, besides the fact that the heat transfer fluid can automatically cycle based on temperature and density variation, the solar thermal heater 50 can also be configured with an additional driving device (not shown), such as pump, for driving the heat transfer fluid to flow between the solar thermal collectors 100 and the storage device 52.

Therefore, the solar thermal collector 100 has superior thermal collecting efficiency. As compared with the conventional technique where the channels and the carrier are separately fabricated and use only welding points as the heat conduction junctions the solar thermal heater 50 applying the solar thermal collectors 100 can have 10%~40% increase in efficiency. Moreover, as the solar thermal collector 100 of the present embodiment has the design that the channels 120 and the carrier 110 share the same outer surface S, a fabrication cost thereof can be decreased by about 20%~50%. Therefore, since the solar thermal collector 100 has superior thermal collecting efficiency and lower fabrication cost, the solar thermal heater 50 using the solar thermal collectors 100 has superior thermal collecting effect and lower factorisation cost.

In summary, according to the solar thermal collector and the manufacturing method thereof, the channels are embedded in the carrier, such that the channels and the carrier may share the same outer surface, so that the contact area between the channels and the carrier is increased. When the light beam enters the solar selective coating, the thermal energy, after transformed from irradiation energy of the light beam, can be directly transmitted to the heat transfer fluid in the channels. Based on the design that the channels and the carrier share the same outer surface, loss of the thermal energy during the transmission process can be decreased, such that the thermal energy can be effectively transmitted to the thermal absorbing medium in the channels. Moreover, the characteristic of the outer surface of the carrier of the solar thermal collector can be changed by configuring a metal layer, such that the carrier is not limited to be made by a fixed type of material.

It will be apparent to those skilled in the art that various modifications and variations can be made to the disclosed embodiments. It is intended that the specification and examples to be considered as exemplary only, with a true scope of the disclosure being indicated by the following claims and their equivalents.

What is claimed is:

1. A solar thermal collector, comprising:
   a carrier;
   a plurality of channels, embedded in the carrier for a heat transfer fluid flowing therein; and
   a solar selective coating, deposited on an outer surface of the carrier, and the solar selective coating comprising:
      a damping layer, deposited by sputtering on the outer surface of the carrier;
      an absorbing layer, deposited by sputtering on the damping layer, wherein the absorbing layer has a transition region adjacent to the damping layer, and the absorbing layer in the transition region comprises a plurality of sub-layers; and
      an anti-reflecting layer, deposited by sputtering on the absorbing layer, wherein a light beam is adapted to enter the absorbing layer and damping layer through the anti-reflecting layer, and irradiation energy of the light beam is transformed by the absorber into thermal energy, which is then transmitted to the heat transfer fluid in the channels.

2. The solar thermal collector as claimed in claim 1, wherein a material of the carrier comprises metal or plastic with an emissivity greater than or equal to 0.1, the solar selective coating further comprises a metal layer, which is deposited between the carrier and the damping layer, and the emissivity of the metal layer is lower than an emissivity of the carrier.

3. The solar thermal collector as claimed in claim 2, wherein a material of the carrier comprises stainless steel (SUS) or polymer.

4. The solar thermal collector as claimed in claim 1, wherein a material of the carrier comprises metal with an emissivity less than 0.1.

5. The solar thermal collector as claimed in claim 1, wherein the carrier comprises two shaped boards, the two shaped boards are attached to each other, and the channels are formed between the two shaped boards.

6. The solar thermal collector as claimed in claim 1, wherein the carrier and the channels are integrally formed through a single material.

7. The solar thermal collector as claimed in claim 1, further comprising:
   at least one connecting tube which is deployed at one side of the carrier and connected to the channels.

8. The solar thermal collector as claimed in claim 1, wherein a material of the damping layer comprises metal nitride, metal carbide or metal carbon nitride.

9. The solar thermal collector as claimed in claim 1, wherein a material of the absorbing layer comprises metal oxide and metal nitride, metal carbide or metal carbon nitride.

10. The solar thermal collector as claimed in claim 9, wherein a proportion of nitrogen content relative to oxygen content in the sub-layers or a proportion of carbon content relative to oxygen content thereof is gradually decreased towards a direction away from the damping layer.

11. The solar thermal collector as claimed in claim 10, wherein the proportion of nitrogen content relative to oxygen content in the sub-layers or the proportion of carbon content relative to oxygen content thereof is gradually decreased to zero towards the direction away from the damping layer.

12. The solar thermal collector as claimed in claim 1, wherein a material of the anti-reflecting layer comprises silicon oxide or silicon nitride.

13. A solar thermal heater, comprising:
   the solar thermal collector as claimed in claim 1; and
   a storage device, connected to the solar thermal collector, and storing the heat transfer fluid.

14. A method for manufacturing a solar thermal collector, comprising:
   providing a carrier, wherein a plurality of channels are embedded in the carrier;
   forming a solar selective coating on an outer surface of the carrier, comprising:
      forming a damping layer by sputtering on the outer surface of the carrier;
      forming an absorbing layer by sputtering on the damping layer, wherein the absorbing layer has a transition region adjacent to the damping layer, and the step of forming the absorbing layer in the transition region comprises sequentially forming a plurality of sub-layers; and
      forming an anti-reflecting layer by sputtering on the absorbing layer.

15. The method for manufacturing the solar thermal collector as claimed in claim 14, further comprising:
   forming a metal layer by sputtering on the outer surface of the carrier before the step of forming the damping layer on the outer surface of the carrier, wherein an emissivity of the metal layer is lower than an emissivity of the carrier.

16. The method for manufacturing the solar thermal collector as claimed in claim 14, wherein the step of providing the carrier comprises:
   providing two shaped boards; and
   attaching the two shaped boards, and forming the channels embedded in the carrier between the two shaped boards.

17. The method for manufacturing the solar thermal collector as claimed in claim 14, wherein the step of providing the carrier comprises:
   integrally forming the carrier and the channels through a single material.

18. The method for manufacturing the solar thermal collector as claimed in claim 14, further comprising:
   forming at least one connecting tube at one side of the carrier, wherein the at least one connecting tube is connected to the channels.

19. The method for manufacturing the solar thermal collector as claimed in claim 14, wherein in the step of sequentially forming the sub-layers, a proportion of nitrogen content relative to oxygen content in the sub-layers or a proportion of carbon content relative to oxygen content thereof is gradually decreased towards a direction away from the damping layer.

20. The method for manufacturing the solar thermal collector as claimed in claim 14, wherein in the step of sequentially forming the sub-layers, a proportion of nitrogen content relative to oxygen content in the sub-layers or a proportion of carbon content relative to oxygen content thereof is gradually decreased to zero towards the direction away from the damping layer.

* * * * *